(12) United States Patent
Wright et al.

(10) Patent No.: US 6,314,116 B1
(45) Date of Patent: Nov. 6, 2001

(54) SINGLE RESONATOR FOR SIMULTANEOUS MULTIPLE SINGLE-FREQUENCY WAVELENGTHS

(75) Inventors: David L. Wright, Emerald Hills; Kurt G. Klavuhn; Alfred Feitisch, both of Los Gatos; Marc K. von Gunten, Los Altos, all of CA (US)

(73) Assignee: Spectra Physics Lasers, Inc., Mountain View, CA (US)

( * ) Notice: Subject to any disclaimer, the term of this patent is extended or adjusted under 35 U.S.C. 154(b) by 0 days.

(21) Appl. No.: 09/111,457

(22) Filed: Jul. 7, 1998

(51) Int. Cl.$^7$ ........................................................ H01S 3/10
(52) U.S. Cl. .................................. 372/20; 372/23
(58) Field of Search ................... 372/23, 20, 92, 372/98

(56) References Cited

U.S. PATENT DOCUMENTS

| | | | |
|---|---|---|---|
| 4,615,034 | 9/1986 | von Gunten et al. | 372/99 |
| 5,068,861 | 11/1991 | Abbott et al. | 372/20 |
| 5,274,661 | 12/1993 | von Gunten et al. | 372/99 |
| 6,134,253 | * 10/2000 | Munks et al. | 372/38 |

OTHER PUBLICATIONS

A. Rhody et al., "Holography Marketplace—The Industry Reference Text and Sourcebook" 7th Ed., Ross Books (1998) (No month).

* cited by examiner

Primary Examiner—James W. Davie
(74) Attorney, Agent, or Firm—Wilson Sonsini Goodrich & Rosati

(57) ABSTRACT

Disclosed is a laser system including a high reflector and an output coupler defining a resonator; a gain medium positioned in the resonator that produces optical gain at more than two desired wavelengths; a coarse selection system, positioned in the resonator and coupled to the gain medium, that produces single transverse modes at the desired wavelengths, with transmission values at the desired wavelengths selected such that power output at the desired wavelengths is maximized, and with transmission values at undesired wavelengths selected to retard lasing at the undesired wavelengths; and a fine selector positioned in the resonator and coupled to the gain medium, having a optical length such that all of the desired wavelengths are substantially simultaneously resonant within the optical length; whereby an output beam is generated. Also disclosed are full-color holography systems and three-dimension laser Doppler velocimetry systems incorporating the inventive laser system.

25 Claims, 10 Drawing Sheets

SINGLE RESONATOR FOR SIMULTANEOUS MULTIPLE SINGLE-FREQUENCY WAVELENGTHS

BACKGROUND OF THE INVENTION

1. Field of the Invention

This invention relates to lasers, and more particularly to improved multiple-color lasers.

2. Description of Related Art

Multiple-wavelength laser systems are used for a variety of applications. In the context of this invention, multiple wavelengths may be taken to mean two or more wavelengths that can be distinguished from each other and be used to convey independent information to the observer or detection apparatus.

One multi-wavelength application is full-color holograms. These holograms present holographic, full-color images. For obvious reasons, such holograms are much preferred to the older generation of monochromatic holograms. Color holograms may be recorded on holographic panchromatic materials. Ultra-high resolution, single-layer, silver-halide emulsions and new photo polymer materials also may be used for this purpose.

A variety of recording setups might be used for full-color holography. However, it appears that the single beam Denisyuk recording scheme has produced the best results with the simplest apparatus. Three laser wavelengths, such as the colors red, green, and blue, are needed for the recording. Suitable colors can be selected from different lasers conventionally in use in holographic recordings: argon, krypton, diode-pumped frequency-doubled Nd:YAG, helium-neon, and helium-cadmium lasers.

Multiple lasers are needed in this arrangement. A prior art color hologram recording set up is illustrated in FIG. 1. FIG. 1 shows color holography laser system 100, including HeNe laser 102; krypton laser 104; argon laser 106; first beam mirrors 108, 109, and 110; second beam mirror 112, and dichroic beam mirrors 114, and 116; optional coherence monitoring system 118; shutter 120, spatial filter 122, hologram recording film 124, and object 130.

HeNe laser 102, krypton laser 104, and argon laser 106 are installed on an independent vibration-isolation system isolated from an optical table surface (not shown). The beams emitted by the lasers are redirected to shutter 120 using first beam mirrors 108, 109, and 110; second beam mirror 112, and dichroic beam mirrors 114, and 116. An optional coherence monitoring system may be placed on the beam path between dichroic beam mirror 116 and the shutter. When the shutter is in the open position, a beam passes through spatial filter 122 and illuminates hologram recording film 124 and object 130. The object is positioned on a side of the hologram recording film opposite from the spatial filter.

In operation, the three colors of light emitted by HeNe laser 102, krypton laser 104, and argon laser 106 are combined into a single "white light" beam using first beam mirrors 108, 109, and 110; second beam mirror 112, and dichroic beam mirrors 114, and 116. Optional coherence monitoring system 118 may be used to monitor beam wavelength purity. The beam is then directed onto shutter 120, which serves to control illumination. When the shutter is open, the beam passes through spatial filter 122, and illuminates hologram recording film 124 and object 130. The light rays reflected from object 130 interfere with the beam incident on the hologram recording film to form a hologram, which is recorded by the hologram recording film.

Such an arrangement represented a significant improvement over earlier full-color hologram methods. Using the dichroic filters in combining laser beams permitted a shortened and simplified exposure procedure without changing mirror positions between exposures as was necessary before using dichroic mirrors. Furthermore, the light intensity and red-green-blue ratio on the recording plane were much less likely to remain undisturbed after initial set-up. This reduced the need for check-up and calibration between hologram recordings.

However, problems still remain with this arrangement. The use of multiple lasers and multiple optical elements significantly increases the cost of the recording system, making it commercially less feasible to produce inexpensive, custom holograms. Additionally, the relatively large number of laser systems and optical elements increases the possibility of failures and beam misalignments.

These problems result primarily from the fact that while conventional laser systems may emit multiple wavelengths, the desired colors are not available from any single laser gain medium. Further, the ratios of the available power at the various desired colors do not necessarily match those needed for conventional films. Additionally, the separation between the wavelengths is such that the emitted colors are not suitable for use in full-color holography. Therefore, the conventional solution, as illustrated in FIG. 1, has been to use multiple lasers with the attendant problems noted above.

Likewise, in other multiple-wavelength applications, such as three-wavelength laser Doppler velocimetry, conventional systems suffer from a number of shortcomings. Three-wavelength laser Doppler velocimetry systems using conventional lasers would require multiple lasers, with attendant cost and reliability issues.

FIGS. 2A, 2B, and 2C show a prior art three-dimensional laser Doppler velocimetry system. Shown in FIG. 2A are lasers 202, 204, 206, and optical fiber network 208. Shown in FIG. 2B are first focusing optic 210, X-direction beam 212, Y-direction beam 214, second focusing optic 216, Z-direction beam 218, measurement volume 220, and fiber optic network 208. Shown in FIG. 2C are second focusing optic 216, Z-direction beam 218, measurement volume 220, back scattered beam 222, detector 224, and signal path 226 to a signal analyzer (not shown).

Lasers 202, 204, and 206 are optically coupled to optical fiber network 208. Optical fiber network 208 is optically coupled to first focusing optic 210, and to second focusing optic 216. Detector 224 is positioned in the optical path behind focusing optic 216 in such a way as to capture back scattered light from measurement volume 220. Detector 224 is coupled by signal path 226 to a signal analyzer (not shown).

In operation, lasers 202, 204, and 206 emit light into fiber optic network 208. Each of lasers 202, 204, and 206 emit on a single wavelength or a single color. Light transmitted by the fiber optic network is delivered to first focusing optic 210, and second focusing optic 216. First focusing optic 210 serves to focus X-direction beam 212 and Y-direction beam 214 that are used to measure velocities in measurement volume 220 in both the X and Y directions. The Z direction measurement is made by light transmitted by fiber optic network 208 focused through second focusing optic 216 and directed as Z-direction beam 218 to measurement volume 220. Results from the measurement volume are captured via back scattered beams, for example, back scattered beam 222, shown in FIG. 2C. The back scattered beam is collected through second focusing optic 216 onto detector 224. The signal from the detector is then transmitted to an analyzer via signal path 226. Although FIG. 2C shows an arrangement for the detection for measurements in the Z direction, similar detector arrangements may be used to monitor the X and Y directions as well.

A problem with current laser Doppler velocimetry systems is that they use laser sources with relatively broad linewidths. These linewidths are typically on the order of 6–8 Giga-hertz measured full width at half maximum. Such relatively broad linewidths translate to relatively short spatial coherence lengths which limit the size of the measurement volume as defined by the interference fringes at the intersection of the two beams. In addition, the relatively broad linewidths also limit the contrast of the interference fringes and thus the signal-to-noise ratio of the laser Doppler velocimetry measurement.

There is therefore a need for a single laser system that addresses these deficiencies in the prior art.

SUMMARY OF THE INVENTION

In an aspect, the invention relates to a laser system comprising a high reflector and an output coupler defining a resonator; a gain medium positioned in the resonator that produces optical gain at more than two desired wavelengths; a coarse selection system, positioned in the resonator and coupled to the gain medium, that produces single transverse modes at the desired wavelengths, with transmission values at the desired wavelengths selected such that power output at the desired wavelengths is maximized, and with transmission values at undesired wavelengths selected to retard lasing at the undesired wavelengths; and a fine selector positioned in the resonator and coupled to the gain medium, having an optical length such that all of the desired wavelengths are substantially simultaneously resonant within the optical length; whereby an output beam is generated.

DETAILED DESCRIPTION OF THE INVENTION

Figure 3:
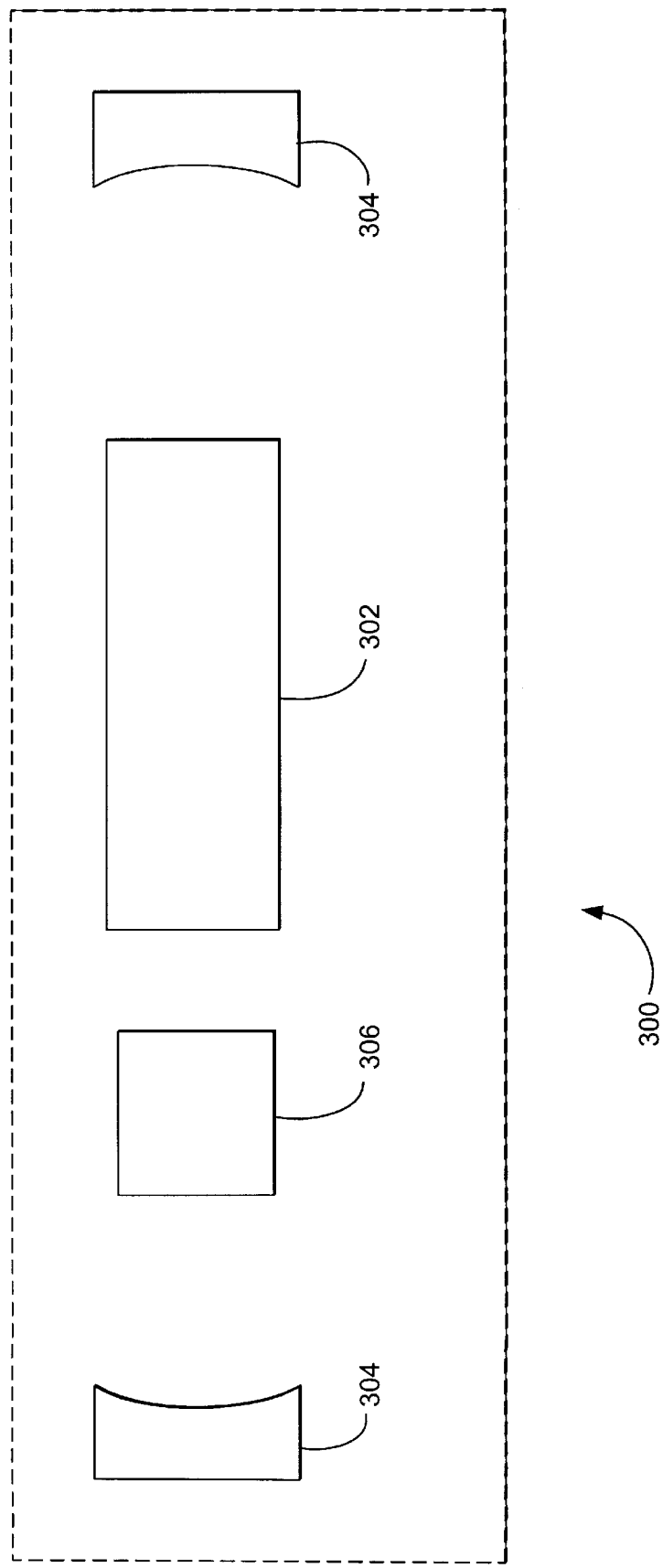
FIG. 3 shows a schematic diagram of a laser system according to the invention.

FIG. 3 shows a laser system 300 according to the invention, including gain medium 302, coarse selection system 304, and fine selector 306. Coarse selection system elements 304 are located on opposing ends of gain medium 302. Fine selector 306 is located between gain medium 302 and either of coarse selection system elements 304. In operation, gain medium 302 produces light that can be emitted from either end of the gain medium. The light passes through fine selector 306. Light leaving the fine selector, and the end of the gain medium opposite from the fine selector is reflected from either of coarse selection system elements 304. Fine selector 306 serves to select the desired wavelengths simultaneously. Coarse selection system 304 serves to reflect desired wavelengths, yet is transmissive for undesired wavelengths.

Gain medium 302 may be a solid, liquid or gas gain medium, and may operate in a continuous-wave or pulsed fashion. Any such gain medium is suitable, so long as it produces optical gain at more than two desired wavelengths. In a preferable embodiment, the ratio of the greatest intensity to the least intensity at the desired wavelengths produced by the gain medium is less than about 5:1, more preferably less than about 2:1, and most preferably about 1:1. For example, assume that the desired wavelengths for an full-color laser system are 488 nm (blue), 514 nm (green), and 647 nm (red). If the wavelength having the greatest intensity is 488 nm, and the wavelength having the least intensity is 647 nm, the ratio of the intensities preferably should be less than about 5:1.

Solid-state gain media may be used in the practice of the invention. Such solid-state gain media according to the invention could be comprised of a variety of materials, preferably including doped crystalline, glass, or semiconductor types. In more preferable embodiments, the solid-state gain media comprise Nd:YAG, Nd:GLASS, or GaAs.

Liquid gain media may also be used in the practice of the invention. Such liquid gain media preferably comprise laser dyes. In more preferable embodiments, the liquid gain media comprise laser dyes such as, but not limited to, Rhodamine or coumarin dissolved or suspended in alcohol or other solvents.

Alternatively, gaseous gain media might be used. For the purposes of this invention, the gas in the gaseous gain media is defined to be inclusive of, but not limited to, either gases or vapors, or mixtures of either gases or vapors, or a mixture of both gases and vapors. In the case of gaseous gain media, the gas is preferably a mixture of gases. Using a mixture of gases permits optimization of light emitted by the gaseous gain medium by adjusting the ratio of the various gases. Preferable gases to be used include, but are not limited to the noble gases such as krypton, xenon, and argon, mixtures of noble gases such as krypton-argon and helium-neon, mixtures of noble gases with other gases such as helium-cadmium, or other gases such as nitrogen, iodine, and copper. In a more preferable embodiment, the gas mixture includes krypton and argon.

In a yet more preferable embodiment, the gas mixture includes krypton and argon in a molar ratio ranging from about 20:1 to about 3:1, based on the total number of moles of the gas mixture. In a most preferable embodiment, the gas mixture includes krypton and argon in a molar ratio of 4:1, based on the total number of moles of the gas mixture.

These gas mixtures according to the invention may be incorporated in a conventional gas laser tube mounted in a conventional gas laser head, such as the BeamLok 2080 from Spectra-Physics (Mountain View, Calif.).

Next, one of the advantages of the inventive laser system is that it may produce single-frequency colors at desired wavelengths. This effect is achieved, to an extent, by using the coarse and fine selection systems. At this point, it is useful to consider the design imperatives of the coarse selection system.

For a material to be an active gain medium for a transition of frequency, v, there must exist a population inversion between an upper (excited) energy level and a lower level of energy spacing, hv, where h is Planck's constant. This means that the number of atoms, ions, or molecules per unit volume or population in the upper energy level is greater than in the lower energy level. In this state, the material will be an active gain medium and act as an amplifier for the particular transition of frequency, v. In a preferable embodiment, the gain medium produces predominantly homogeneously broadened emission that is efficient at single wavelength generation.

However, in some types of multiple-energy-level atomic, ionic, or molecular gain media, there exists two energy transfer characteristics that may cause, in a laser device, what is referred to in the art as line competition. The first type of energy transfer characteristic, upper-level competition, occurs when the upper energy level is shared by two or more of the lasing transitions or lines. Each transition, i, offers a separate channel by which the excited atom, ion, or molecule may be stimulated to emit a photon, of frequency vi, unique to that transition, and relax into the lower energy level. For each additional transition sharing the common upper energy level, the probability that the excited atom, ion, or molecule will be stimulated to emit a photon of any one particular wavelength is reduced. In this respect, these transitions or lines compete.

The second type of energy transfer characteristic, lower-level competition, occurs when the rate of depletion from a shared lower energy level is relatively slow compared to the rate of population from upper energy levels. This is referred to in the art as radiative trapping. For each additional transition populating the shared lower energy level, the population inversion for any given transition, i, and thus the probability that the excited atom, ion, or molecule will emit a photon of frequency, $v_i$, is reduced. In this respect, the available transitions or lines sharing the lower energy level compete.

By adjusting the laser cavity losses to selectively suppress competing lines, the performance of the remaining line or lines may be enhanced. For example, in a conventional krypton or argon-krypton ion laser, there exists upper- and lower-level competition with krypton ions. The desired 647.1-nm (red) line shares the upper energy level with the 530.9-nm (green) line. It also shares the lower energy level with the 568.2-nm (yellow), 481.5-nm (blue), 484.7-nm (cyan), 461.9-nm (blue) lines. By suppressing these particular lines and reducing or eliminating the upper- and lower-level competition, the performance of the 647.1-nm line will be enhanced.

The cavity losses are determined, in part, by the coarse selection system. The design of the coarse selection system is such as to optimize the cavity losses (output coupling) for the desired wavelengths while increasing the losses at the undesired or competing wavelengths.

A wide variety of structures might be envisioned by one of skill to achieve this goal. In a preferable embodiment, the coarse selection system involved the structures disclosed in U.S. Pat. No. 5,274,661 (von Gunten et al.) and U.S. Pat. No. 4,615,034 (von Gunten et al.). These documents, and all other documents cited to herein, are incorporated by reference as if reproduced fully herein. The structures in these patents are preferable because they permit tailoring a wavelength-selective mirror providing single-wavelength operation of a laser system. Additionally, the structures in these patents are preferable because they provide the desired transmission curves with acceptable loss characteristics. In a preferable embodiment, the coarse selection system exhibits maximum losses, for example scatter and absorption losses, of about 0.1%. In a more preferable embodiment, the maximum losses are about 0.05%.

Figure 4B:
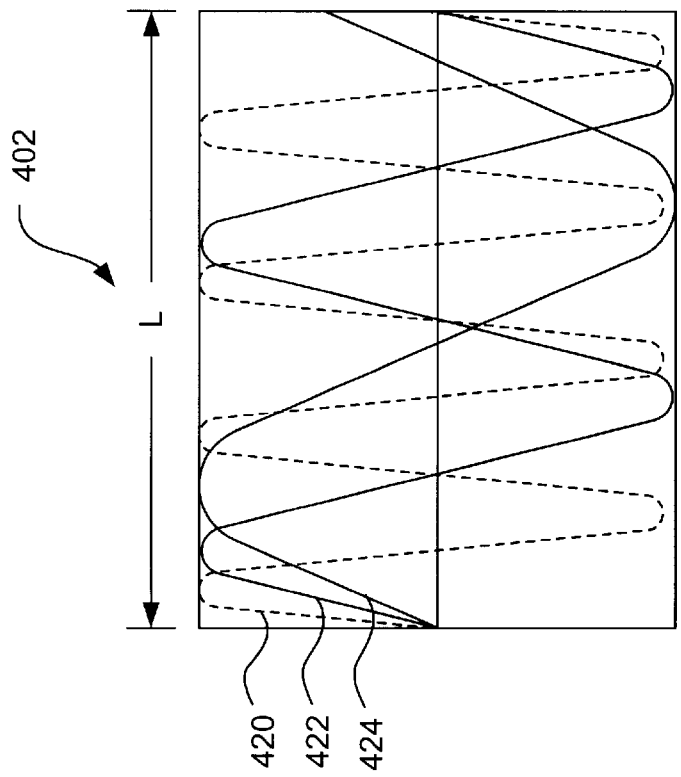
FIGS. 4A–B shows graphs of waveforms having an integer and non-integer number of wavelengths in a length "L".
Figure 4A:
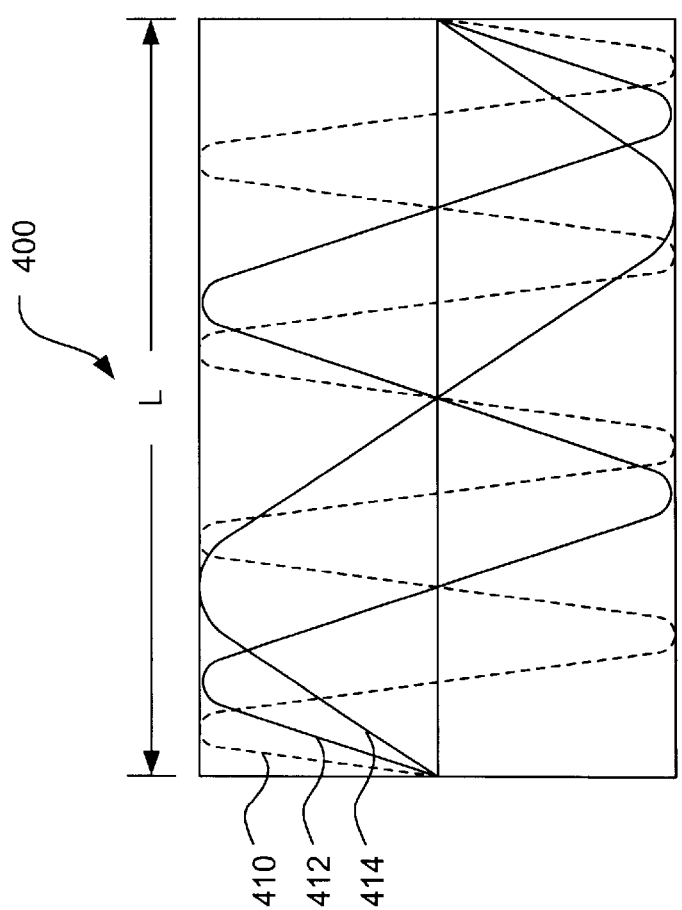

FIGS. 4A–B illustrate operation of the fine selector in a full-color operation. The fine selector serves to select one axial cavity mode out of the numerous modes that are resonating within the bandwidth of each desired color. A level of preferably about 95% or better of the available energy is restricted to the selected mode. By restricting lasing to the selected mode, the fine selector serves to promote long coherence lengths at the desired colors, which is important for holography.

Shown in FIG. 4A is a series of waveforms 400, including waveform 410, waveform 412, and waveform 414. Each of waveforms 410, 412, and 414 are present in the cavity distance labeled as "L." Each of the waveforms 410, 412, and 414 exist in cavity distance "L" in a substantially integer number of wavelengths. This illustrates the case where desired colors emitted by a gain medium (not shown), are substantially simultaneously resident at the desired wavelengths, thus selecting for the desired colors.

In contrast, FIG. 4B shows an undesirable case, where waveforms are present in a non-integer number of wavelengths. Present in waveform 402 are individual waveforms 420, 422, and 424. Waveforms 420, 422, and 424 represent different colors of light. As is shown, the cavity distance "L" exists such that the waveforms 420, 422, 424 are not present in the cavity distance "L" an integer number of times. Thus the desired colors are not selected for, nor are they substantially simultaneously resonant at the desired color frequencies.

Optical elements that can be used as the fine selector include any element that is substantially simultaneously resonant at the desired wavelengths. Examples of suitable fine selectors include thin film coatings and etalons.

In the case of thin film coatings, a variety of designs may be used in the practice of this invention. Any thin film structure that is substantially simultaneously resonant at the desired wavelengths may be used in the practice of this invention. Such thin film structures are contemplated as within the scope of this invention.

Figure 5:
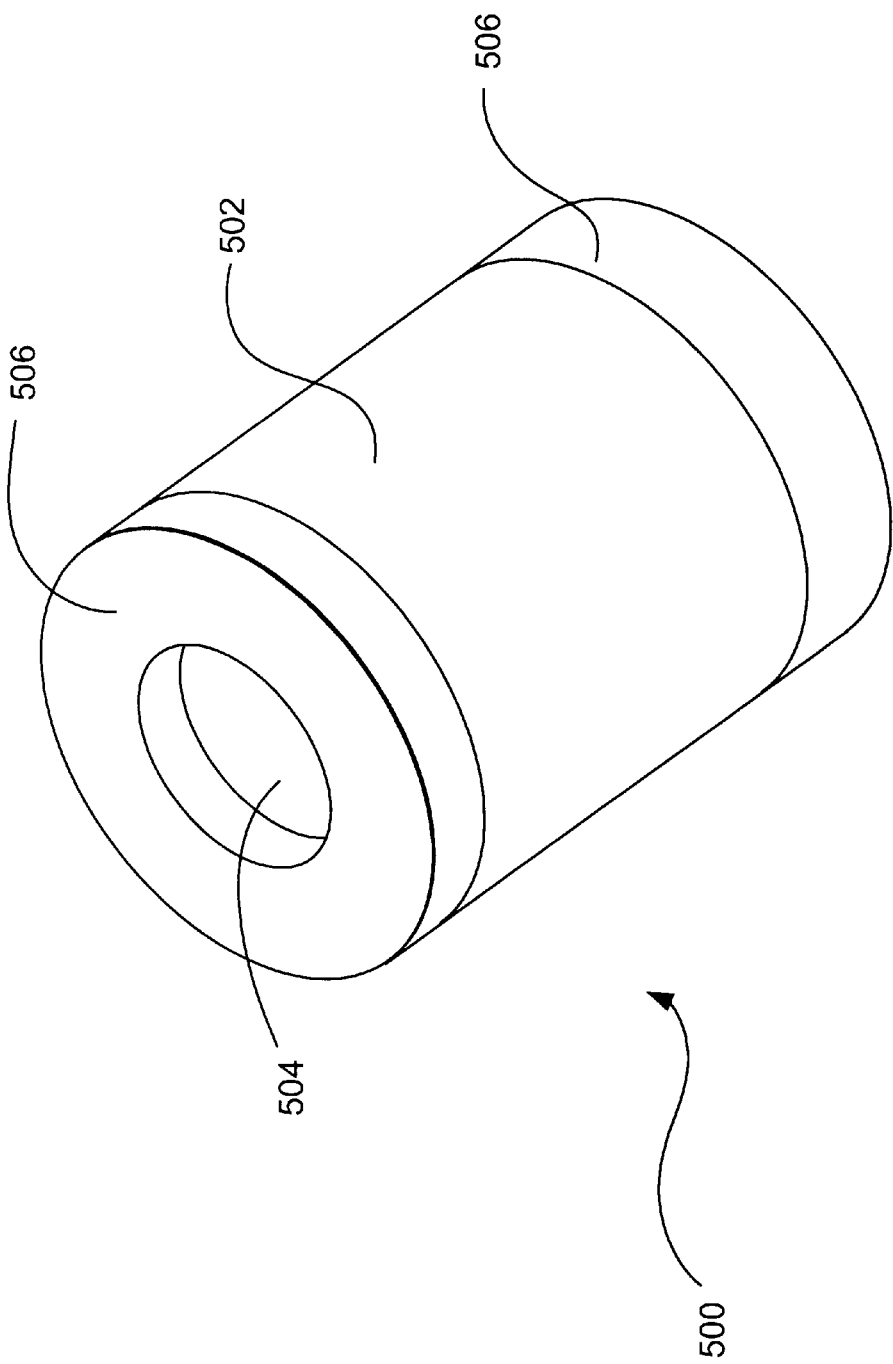
FIG. 5 shows a side isometric view of a solid etalon according to the invention.

Alternatively, etalons may be used as fine selections according to the invention. Etalons are discussed generally in Jenkins and White, Fundamentals of Optics, McGraw-Hill (1957). FIG. 5 shows such an etalon. Shown is etalon 500, which includes spacer 502, through hole 504, and end optical windows 506.

Spacer 502 possesses a distal and proximal end with optical windows 506 present on both ends. Through hole 504 passes through spacer 502 permitting light to pass through optical windows 506. In operation laser light is passed through etalon assembly 500, where desired wavelengths are selected based on the length of the spacer.

The etalon of FIG. 5 is known as a solid etalon, because the spacer is made of a solid piece of material. While such etalons may be used in the practice of this invention, their use presents significant problems. Solid etalons must be machined to a distance "L" that corresponds to a substantially integer number of wavelengths for each of the desired wavelengths. This task, while relatively easy for a single wavelength, is more difficult for a two-wavelength etalon, and is extraordinarily difficult for more than two wavelengths. Values of "L" that correspond to a substantially integer number of wavelengths for each of the desired wavelengths occur only at specific points along the "L" axis. If the solid etalon is accidentally machined past one of these points, it may not be possible to recover from that error. In that case, the entire etalon spacer becomes scrap, and the procedure must start over again. Yield rates for solid etalons may be on the order of a few percent.

Furthermore, the length "L" of a solid etalon in use in the field may change due to thermal expansion of the material making up the etalon. Such expansion may occur due to ambient temperature differences or may be due to heat absorbed by the etalon during use. Therefore, if a solid etalon is used, temperature control of the etalon is important. Such temperature control devices are known conventionally, and may be available, for example, as the 587B Etalon Oven Assembly from Spectra-Physics (Mountain View, Calif.). In a preferable embodiment, changing the temperature of the solid etalon may be used to control the length of the etalon. In another preferable embodiment, the laser system according to the invention includes fine selectors, with the proviso that solid etalons are excluded.

In addition to solid etalons, the inventive etalons may be adjustable. This means that the length between the optical windows of the etalon, and/or the angle or degree of parallelism between the optical windows of the etalon may be adjusted. The inventive etalons may be adjusted using a variety of structures, including, but not limited to, mechanical, thermal, piezoelectrical or magnetorestrictive structures. Preferable materials for etalon spacers includes invar, and superinvar. Higher expansion materials may be used with appropriate temperature controls.

In another preferable embodiment, the optical loss in an inventive etalon is proportional to the gain of the transmitted line. In still another preferable embodiment, the optical windows in an inventive etalon are coated. In a more preferable embodiment, the coating is a reflective coating. In a still more preferable embodiment, the reflective coating reflects between about 4% to about 50% of light at the desired wavelengths.

Figure 6:
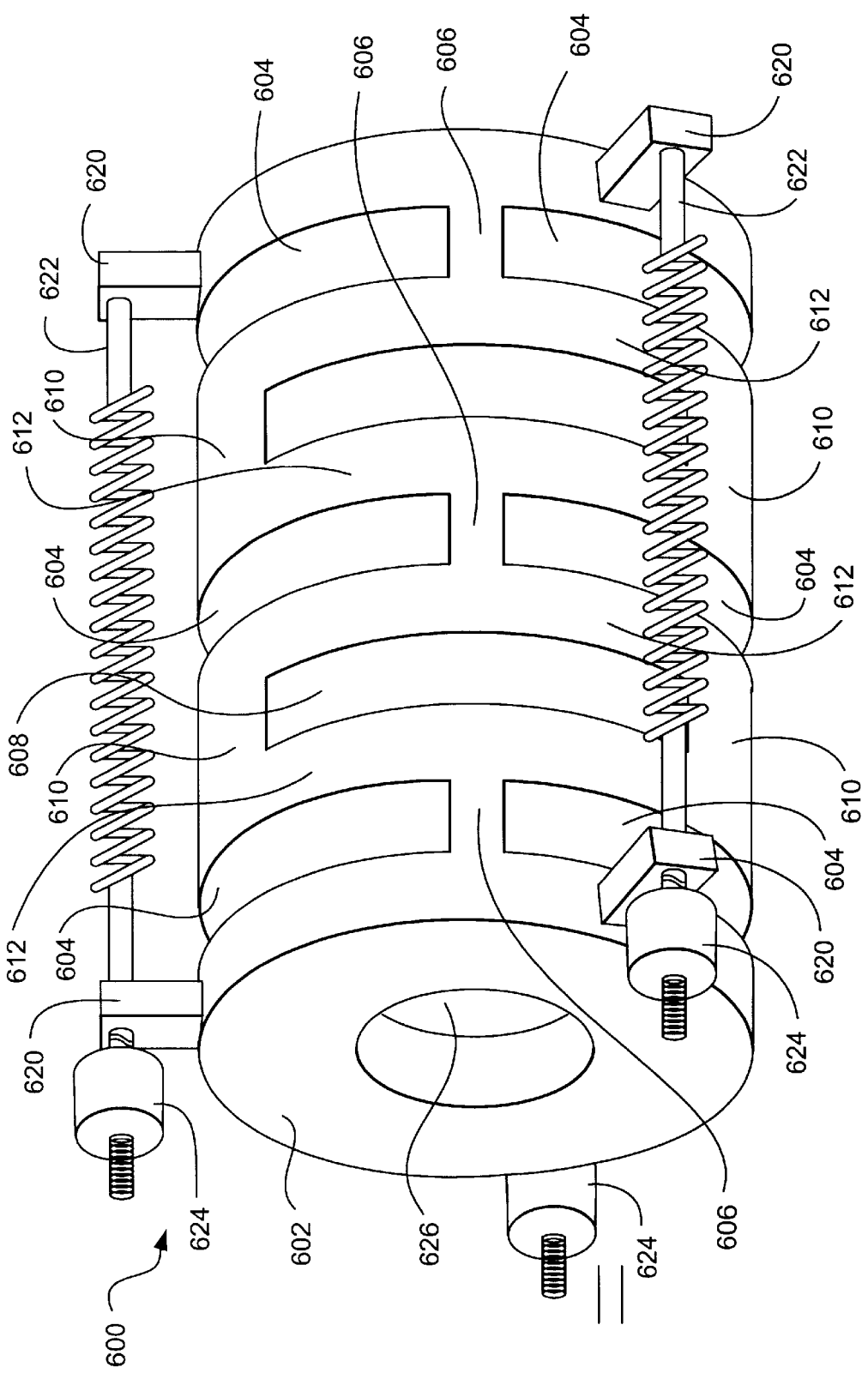
FIG. 6 shows a side isometric view of one embodiment of a mechanically adjustable spacer for use in an adjustable etalon according to the invention.

FIG. 6 shows a different adjustable spacer structure usable in an etalon according to the invention. Adjustable spacer 600 includes spacer body 602, first openings 604, first casing sections 606, second openings 608, second casing sections 610, separation bands 612, six screw mounting pieces 620, six threaded adjusting pieces 622, three adjusting nuts 624 and through hole 626. Optical windows at either end of the spacer are not shown.

Spacer body 602 has a roughly cylindrically shaped surface possessing a radial and a longitudinal axis. First openings 604 penetrate completely through an arc of the spacer surface, and are radially separated by first casing sections 606. Second openings 608 penetrate completely through an arc of the spacer surface, and are radially separated by second casing sections 610. The first and second openings are separated axially by separation bands 612. Additionally, the first and second openings are offset from one another radially, such that the first and second casing sections are not present at substantially the same point on the spacer's radial axis. Six screw mounting pieces 620 are mounted to the casing at opposing ends of the spacer, and are configured to accept three threaded adjusting pieces 622. Three adjusting nuts 624 thread onto the threaded adjusting pieces Through hole 626 passes completely through the spacer along the spacer's longitudinal axis. Optical windows (not shown) may be mounted at either end of the spacer to form the etalon proper.

In operation, screw mounting pieces 620, adjusting nuts 624, and threaded adjusting pieces 622 operate cooperatively to adjust the length of spacer 602, via the attachment of the screw mounting pieces to the spacer, until it reaches the desired length "L". The stiffness of the spacer is much greater than the stiffness of the threaded adjusting pieces so that adjustment of adjusting nuts 624 produces a very much smaller controlled motion of length of the spacer. In a preferable embodiment, the length of the spacer is adjusted dynamically based on feedback parameters, such as dynamically measured length of the spacer or spacer temperature, etc. Additionally, the use of three adjustments in any of the inventive adjustable etalons permits adjustment of angle (degree of parallelism between the optical windows), together with length. The presence of first openings 604 and second openings 608 permits the spacer to flex more readily at the intersections of the first and second casing sections 606, 608 with separation bands 612. Further, the presence of a spring portion of the threaded adjusting pieces permit the threaded adjusting pieces to flex as they are rotated. This permits a reasonable latitude in the rotational adjustment's relationship to the resulting length—if the threaded adjustment piece was a threaded rod, then it would be extremely difficult to rotate it sufficiently finely to get the micron-level accuracy needed. In a preferable embodiment of a mechanically adjustable etalon according to the invention, the mechanically flexing etalon spacers have a design creep of less than 0.1 microns.

Figure 7:
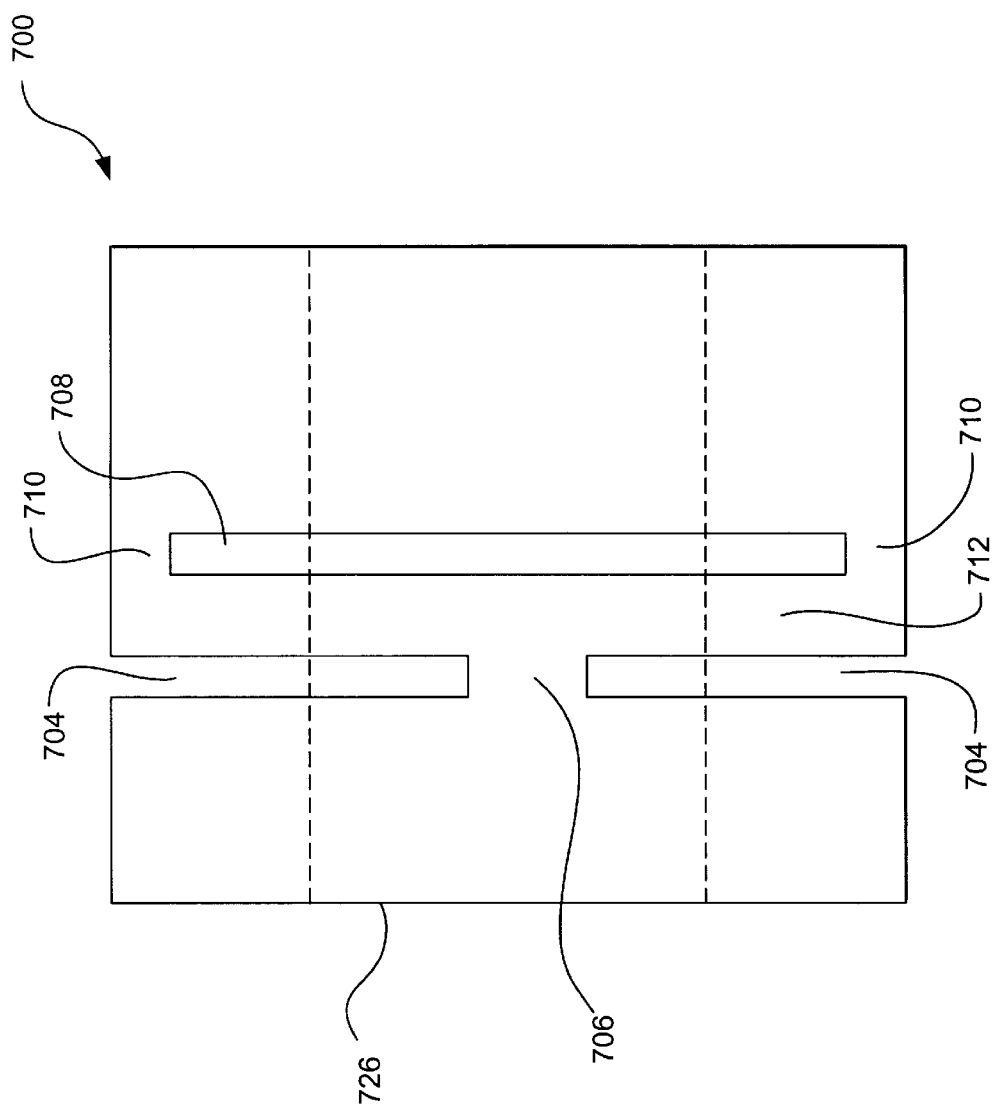
FIG. 7 shows a side view of a mechanically adjustable spacer for use in an adjustable etalon according to the invention.

FIG. 7 shows a cross section of the adjustable spacer described in FIG. 6. The components, structure, and operation of the adjustable spacer shown in FIG. 7 is identical to that shown in FIG. 6.

Figure 8:
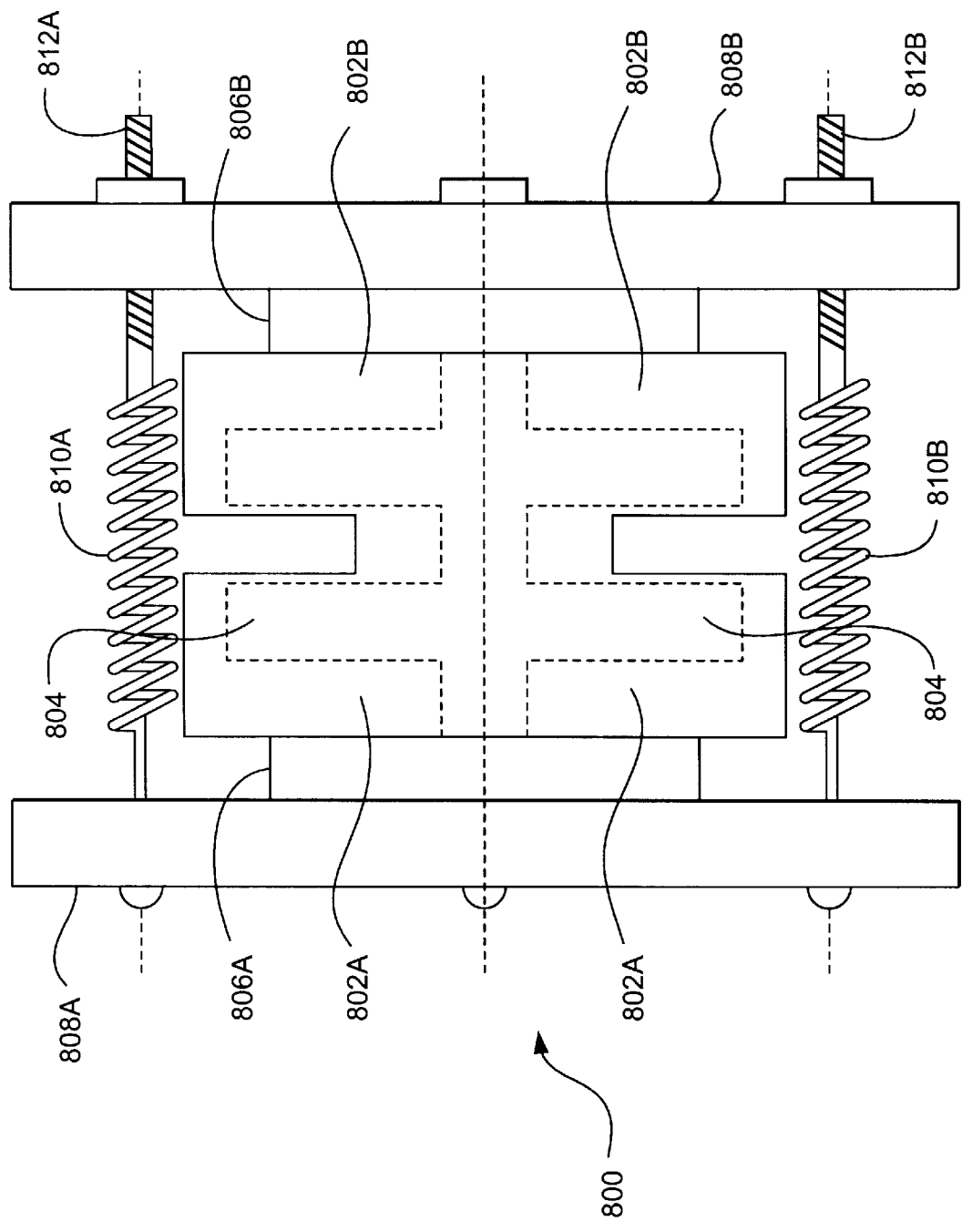
FIG. 8 shows a side view of one embodiment of a mechanically adjustable etalon according to the invention.

FIG. 8 shows a cross section of another adjustable etalon according to the invention. Adjustable etalon 800 includes cylindrical portions 802A–B, pleated portion 804, optical windows 806A–B, securing plates 808A–B, tensioning springs 810A–B, and tensioning spring adjusters 812A–B.

Pleated portion 804 is located between cylindrical portions 802A–B. On the side of the cylindrical portions opposite from the pleated portion are located optical windows 806A–B. On the side of the optical windows opposite from the cylindrical portions are located securing plates 808A–B. The securing plates are coupled to one another via tensioning springs 810A–B and tensioning spring adjusters 812A–B.

In operation, the length "L", which is the distance between optical windows 806A–B, may be adjusted by exerting pressure upon cylindrical portions 802A–B, directly or indirectly, thus compressing pleated portion 804. Additionally, the use of three adjustments in any of the inventive adjustable etalons permits adjustment of angle (degree of parallelism between the optical windows), in addition to length. Optical windows 806 serve to select desired wavelengths for transmission, in conjunction with cylindrical portions 802A–B and pleated portion 804. Securing plates 808A–B serve to hold together the entire assembly, and to locate the optical windows. Tensioning springs 810A–B serve to hold the entire assembly under tension. The amount of tension exerted by the tensioning springs can be adjusted using tensioning spring adjusters 812A–B.

Figure 9:
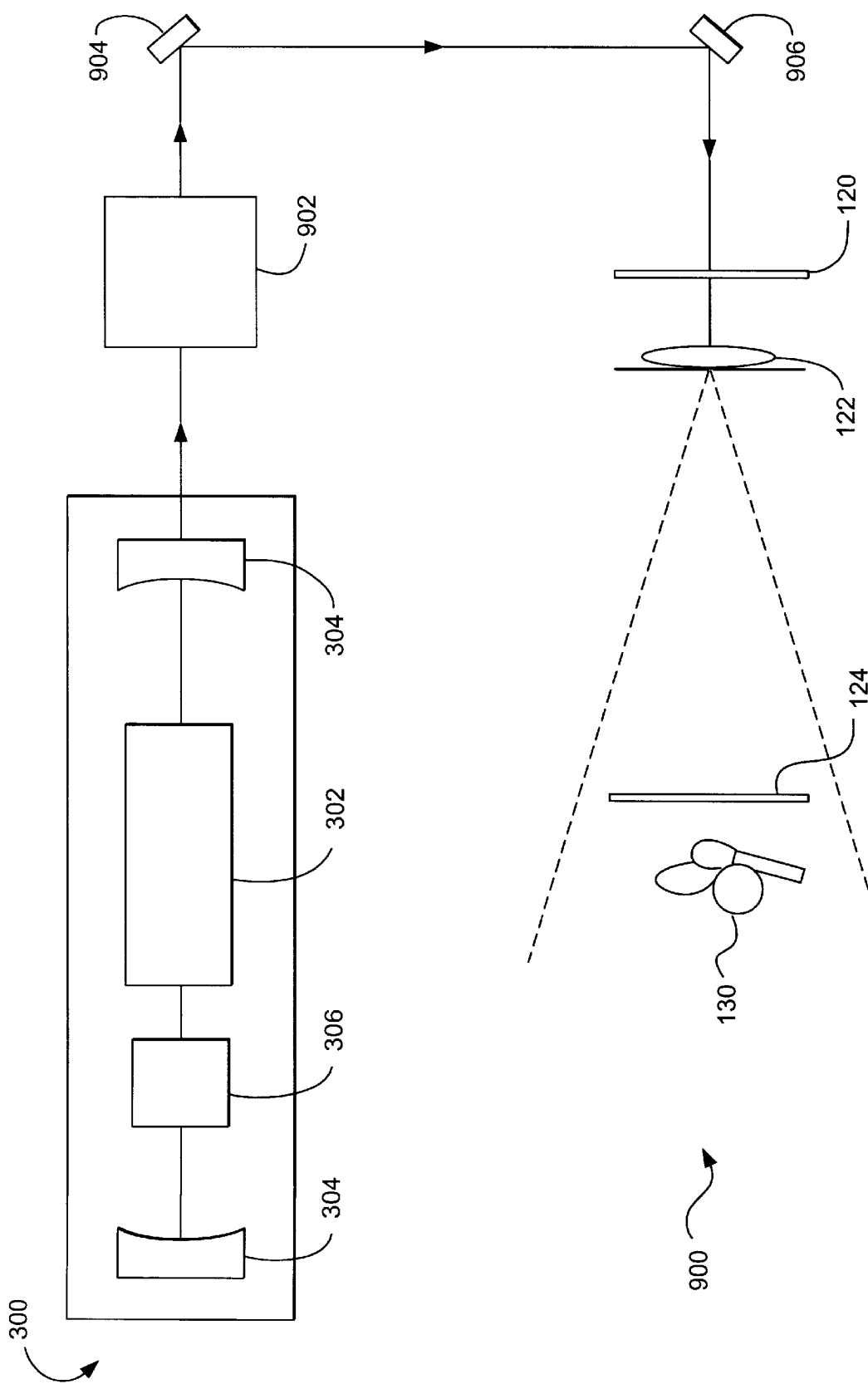
FIG. 9 shows a schematic diagram of a full-color holography system according to the invention.

FIG. 9 shows a schematic of color holography recording system 900 according to the invention. Included in the system are laser system 300, Red-Green-Blue filter 902, first beam mirror 904, second beam mirror 906, shutter 120, spatial filter 122, hologram recording film 124, and object 130.

Laser system 300, according to the invention, has been described above in FIG. 3. The components, structure, and operation of the laser system are identical to those described in FIG. 3. Placed on the beam path between the laser system and shutter 120 are Red-Green-Blue filter 902, first beam mirror 904, and second beam mirror 906. When the shutter is in the open position, a beam passes through spatial filter 122 and illuminates hologram recording film 124 and object 130. The object is positioned on a side of the hologram recording film opposite from the spatial filter.

In operation, the three colors of light emitted by laser system 300 are further processed by Red-Green-Blue filter 902 to further remove any unwanted wavelengths. First beam mirror 904 and second beam mirror 906 serve to redirect the beam to shutter 120. The shutter serves to control illumination. When the shutter is open, the beam passes through spatial filter 122, and illuminates hologram recording film 124 and object 130. The light rays reflected from object 130 interfere with the beam incident on the hologram recording film to form a hologram, which is recorded by the hologram recording film.

Figure 1:
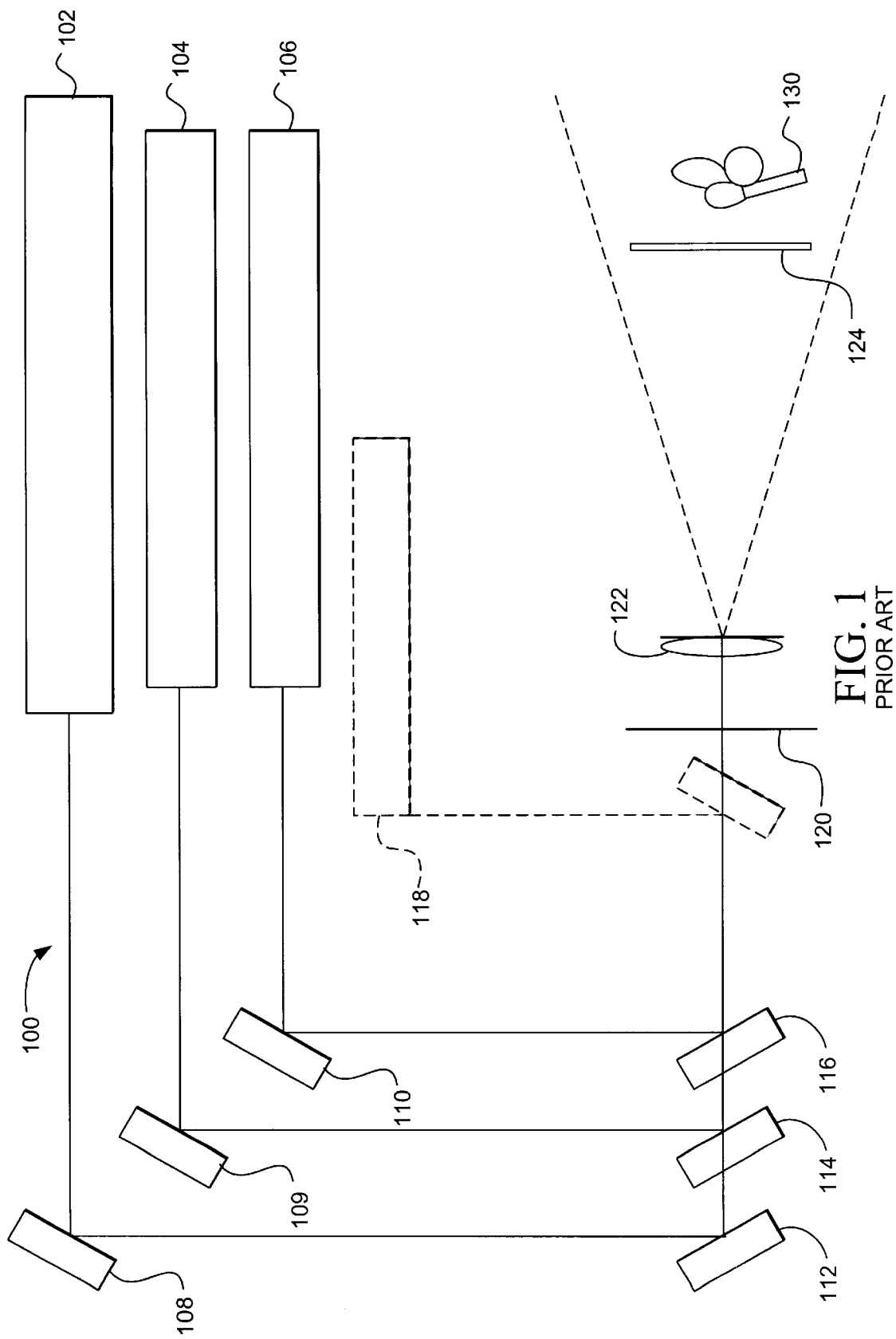
FIG. 1 shows a schematic diagram of a prior art full-color holography system.

System 900, as outlined above, possesses advantages over the conventional system shown in prior art FIG. 1 of lower equipment cost, less maintenance cost, and more compact design. Another advantage of the laser system according to the invention is that it can deliver relatively high power. In a preferable embodiment, the power of the beam emitted by the laser system according to the invention ranges from about 0.5 milliwatts to about 20 watts. In a more preferable embodiment, the power of the beam emitted by the laser system according to the invention ranges from about 0.1 watts to about 5 watts. In another preferable embodiment, the power of the beam emitted by the laser system according to the invention is at least about 0.5 watts. In a more preferable embodiment, the power of the beam emitted by the laser system according to the invention is at least about 1.0 watts.

Figure 2B:
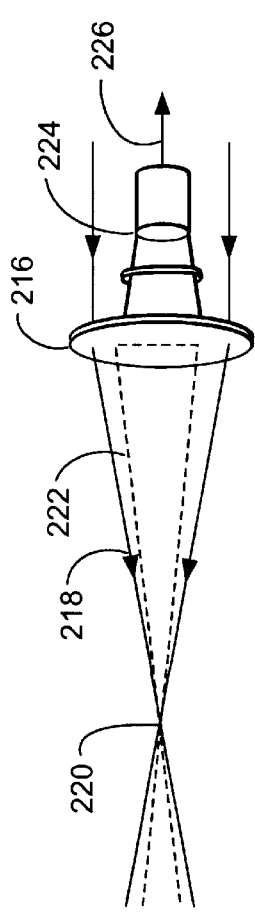
FIGS. 2A, 2B, and 2C show a schematic diagram of a prior art three-dimensional laser Doppler velocimetry system.
Figure 2C:
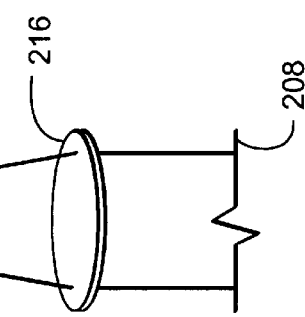
Figure 2A:
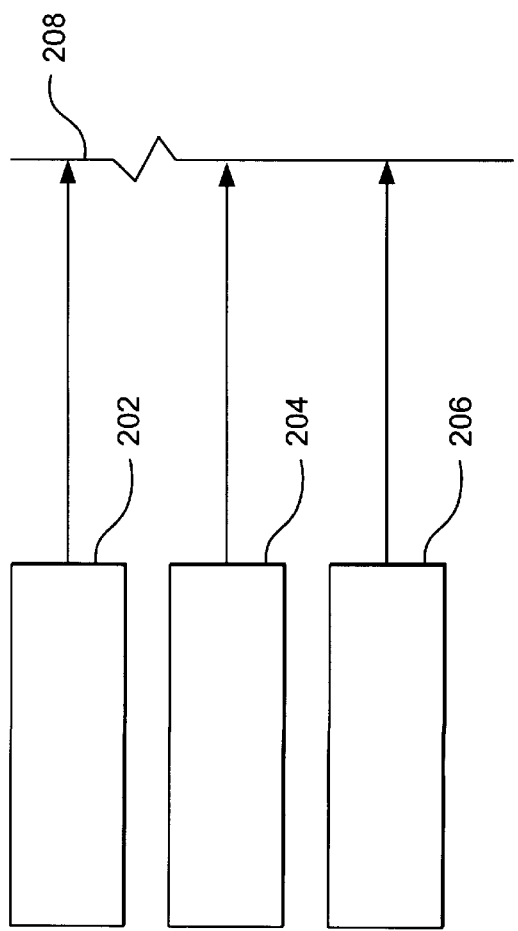
Figures 10A, 10B, 10C:
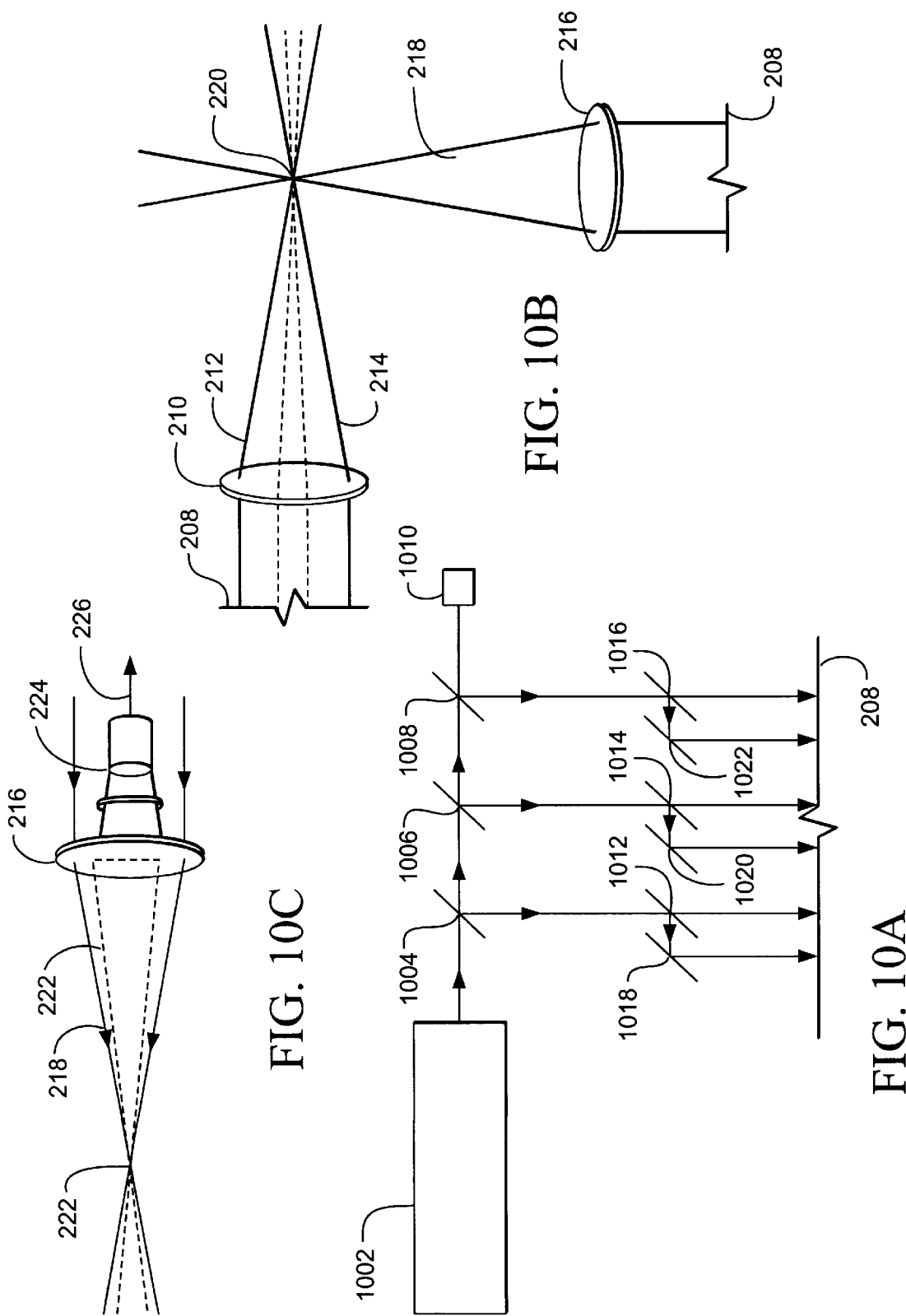
FIGS. 10A, 10B, and 10C show a schematic diagram of a three-dimensional laser Doppler velocimetry system according to the invention.

FIGS. 10A, 10B, and 10C show a three-dimensional laser Doppler velocimetry system according to the invention. Shown are FIGS. 10A, 10B, and 10C. Shown in FIG. 10A are laser 1002, beam splitters 1004, 1006, and 1008, beam dump 1010, focusing optics 1012, 1014, 1016, 1018, 1020, and 1022, and fiber optic network 208. Shown in FIG. 10B are first focusing optic 210, X-direction beam 212, Y-direction beam 214, second focusing optic 216, Z-direction beam 218, measurement volume 220, and fiber optic network 208. Shown in FIG. 2C are second focusing optic 216, Z-direction beam 218, measurement volume 220, back scattered beam 222, detector 224, and signal path 226 to a signal analyzer (not shown).

Laser 1002 is optically coupled to optical fiber network 208 via beam splitters 1004, 1006, and 1008, beam dump 1010, and focusing optics 1012, 1014, 1016, 1018, 1020, and 1022. Optical fiber network 208 is optically coupled to first focusing optic 210, and to second focusing optic 216. Detector 224 is positioned in the optical path behind focusing optic 216 in such a way as to capture back scattered light from measurement volume 220. Detector 224 is coupled by signal path 226 to a signal analyzer (not shown).

In operation, laser 1002 emits three separate and simultaneous wavelengths or colors of light. This light is collected and redirected into optical fiber network 208 by the action of beam splitters 1004, 1006, and 1008, beam dump 1010, and focusing optics 1012, 1014, 1016, 1018, 1020, and 1022. Light transmitted by the fiber optic network is delivered to first focusing optic 210, and second focusing optic 216. First focusing optic 210 serves to focus X-direction beam 212 and Y-direction beam 214 that are used to measure velocities in measurement volume 220 in both the X and Y directions. The Z direction measurement is made by light transmitted by fiber optic network 208 focused through second focusing optic 216 and directed as Z-direction beam 218 to measurement volume 220. Results from the measurement volume are captured via back scattered beams, for example, back scattered beam 222, shown in FIG. 2C. The back scattered beam is collected through second focusing optic 216 onto detector 224. The signal from the detector is then transmitted to an analyzer via signal path 226. Although FIG. 2C shows an arrangement for the detection for measurements in the Z direction, similar detector arrangements may be used to monitor the X and Y directions as well.

This arrangement permits convenient enlargement of the three measurement volumes required for three-dimensional laser Doppler velocimetry as compared to the prior art because of the three narrow-linewidth, or single-frequency wavelengths produced by a single resonator. The narrow linewidths translate to longer spatial coherence lengths and thus larger areas over which the two beams making up the measurement volume interfere. Additionally, the narrow-linewidth, or single-frequency output of the invention provides improved fringe contrast in the measurement volume resulting in improved signal-to-noise ratio.

The foregoing description of preferable embodiments of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A laser system, comprising:
    a high reflector and an output coupler defining a laser cavity;
    a gain medium positioned in the laser cavity, wherein the gain medium is characterized by optical gain at least equal to laser cavity optical losses at more than two desired wavelengths;
    a first lasing wavelength selector positioned in the laser cavity and coupled to the gain medium, wherein the first wavelength selector comprises at least one material layer and is characterized by transmission values as a function of wavelength that allow lasing on the more than two desired wavelengths and inhibit lasing on other wavelengths thereby coarsely selecting laser wavelengths; and
    a second lasing wavelength selector comprising an interference filter positioned in the laser cavity and coupled to the gain medium, wherein a plurality of reflective surfaces of the interference filter are spaced to provide substantial and simultaneous resonance at the more than two desired wavelengths, thereby finely selecting laser wavelengths.

2. The laser system of claim 1, wherein a ratio of a greatest intensity to a least intensity at the desired wavelengths produced by the gain medium is less than about 5:1.

3. The laser system of claim 2, wherein a ratio of a greatest intensity to a least intensity at the desired wavelengths produced by the gain medium is less than about 2:1.

4. The laser system of claim 3, wherein a ratio of a greatest intensity to a least intensity at the desired wavelengths produced by the gain medium is about 1:1.

5. The laser system of claim 1, wherein the gain medium produces predominantly homogeneously broadened spectral lines.

6. The laser system of claim 1, wherein the gain medium comprises a liquid or a solid gain medium.

7. The laser system of claim 6, wherein the gain medium comprises a gas gain medium.

8. The laser system of claim 7, wherein the gain medium is an ionizable gas gain medium.

9. The laser system of claim 7, wherein the gas gain medium comprises at least one element from a set of elements consisting of krypton, xenon, argon, cadmium, nitrogen, iodine, and copper.

10. The laser system of claim 9, wherein the gas gain medium comprises mixtures of gases from the set of elements.

11. The laser system of claim 10, wherein the gas gain medium comprises a mixture of krypton and argon in a molar ratio ranging from about 3:1 to about 20:1, respectively, based on the total number of moles.

12. The laser system of claim 11, wherein the gas gain medium comprises a mixture of krypton and argon in a molar ratio of about 4:1, based on the total number of moles.

13. The laser system of claim 1, wherein the first lasing wavelength selector possesses a loss of less than about 0.1%.

14. The laser system of claim 1, wherein the gain medium produces optical gain at three or more desired wavelengths.

15. The laser system of claim 1, wherein the gain medium produces optical gain at four or more desired wavelengths.

16. The laser system of claim 1, wherein the laser system is a continuous wave laser system.

17. The laser system of claim 1, wherein the laser system is a pulsed laser system.

18. The laser system of claim 1, wherein the interference filter is a thin film stack.

19. The laser of claim 1, wherein the interference filter is an etalon.

20. The laser of claim 19, wherein the etalon is an adjustable etalon.

21. The laser of claim 20, wherein the adjustable etalon is adjusted mechanically, piezoelectrically, thermally or magnetically.

22. A full-color holography system, comprising:

the laser system of claim 1; and a hologram-storing medium.

23. A three-dimensional laser Doppler velocimetry system, comprising:

the laser system of claim 1; and at least one photodetector.

24. A method of producing or viewing full-color holographic images, comprising:

providing the laser system of claim 1, and illuminating a hologram-storing medium with the laser system.

25. A laser system, comprising:

a high reflector and an output coupler defining a laser cavity;

a gaseous gain medium positioned in the laser cavity that produces optical gain at three or more desired wavelengths, the gaseous gain medium comprising a mixture of krypton and argon gases in a ratio of about 4:1;

a first lasing wavelength selector positioned in the laser cavity and coupled to the gain medium, wherein the first wavelength selector comprises at least one material layer and is characterized by transmission values as a function of wavelength that allow lasing on the more than two desired wavelengths and inhibit lasing on other wavelengths thereby coarsely selecting laser wavelengths; and a second lasing wavelength selector comprising an interference filter positioned in the laser cavity and coupled to the gain medium, wherein a plurality of reflective surfaces of the interference filter are spaced to provide substantial and simultaneous resonance at the more than two desired wavelengths, thereby finely selecting laser wavelengths.

* * * * *